INVENTOR.
FREDERICK A. GRUETJEN
BY
Andrus & Starke
Attorneys

June 25, 1963  F. A. GRUETJEN  3,094,958
BRAZING FIXTURE
Filed Oct. 27, 1958  3 Sheets-Sheet 2
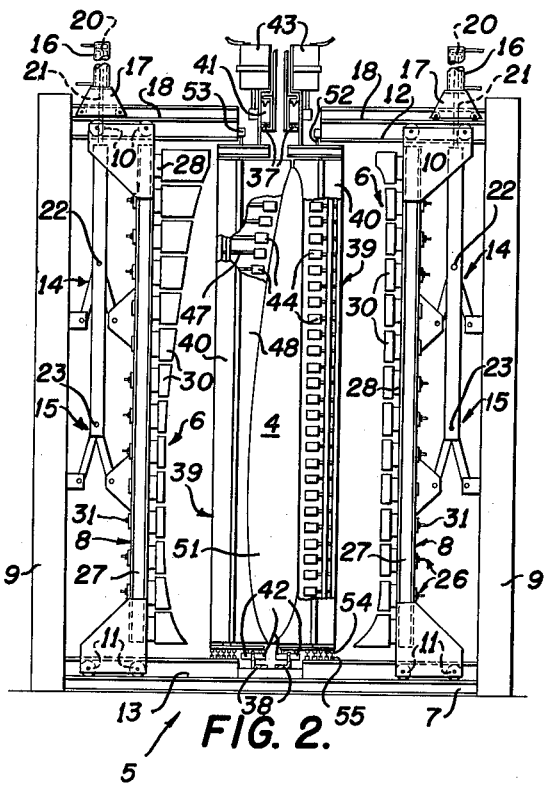
FIG. 2.
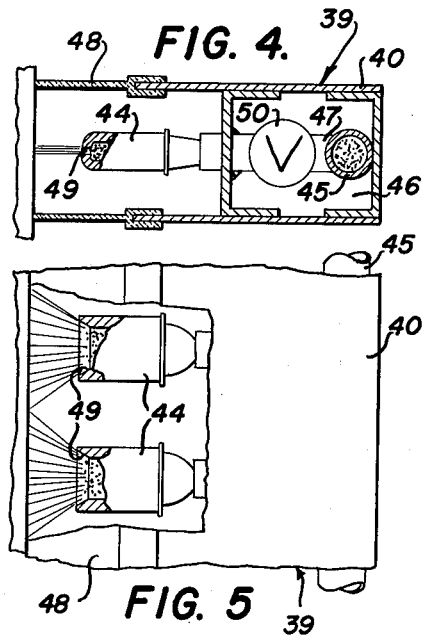
FIG. 4.
FIG. 5
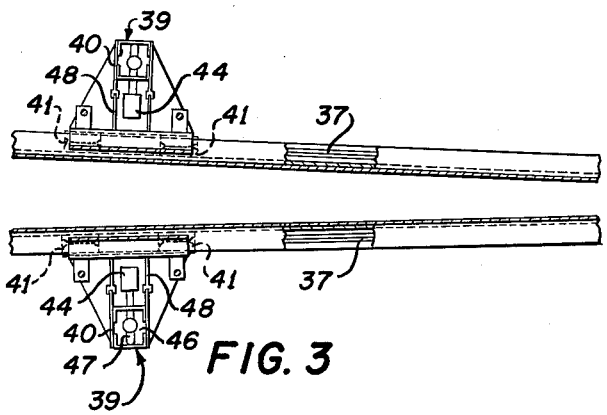
FIG. 3
INVENTOR.
FREDERICK A. GRUETJEN
BY
Andrus & Starke
Attorneys June 25, 1963 F. A. GRUETJEN 3,094,958
BRAZING FIXTURE
Filed Oct. 27, 1958 3 Sheets—Sheet 3

INVENTOR.
FREDERICK A. GRUETJEN
BY
Andrus & Starke
Attorneys

United States Patent Office 3,094,958
Patented June 25, 1963

3,094,958
BRAZING FIXTURE
Frederick A. Gruetjen, Wauwatosa, Wis., assignor to A. O. Smith Corporation, Milwaukee, Wis., a corporation of New York
Filed Oct. 27, 1958, Ser. No. 769,908
8 Claims. (Cl. 113—133)

This invention relates to an apparatus for brazing the outer skin layer to a honeycomb core structure in fabricating structural members for aircraft and other purposes.

Fabricated honeycomb structural members have proven useful in a number of applications where low weight and high strength are desired. These characteristics make them particularly useful for aircraft structures such as wings, stabilizers, fuselage panels, etc. These structures are generally of considerable size and according to known practices the skins are brazed to the core structure in smaller sections which are subsequently assembled to form the entire structure, and the brazing is generally performed between special dies. It is generally an object of this invention to provide a method and apparatus for brazing large honeycomb structural members in one piece and thus eliminate the more costly sectionalized construction and the need for special dies.

According to this invention, the apparatus for brazing the skin layers, generally of stainless steel, to a metal honeycomb core structure comprises longitudinally spaced clamping means wherein the honeycomb core and skin assembly are clamped in the bonding position. Heating means are provided which are adapted to heat the peripheral brazing surfaces of the assembled structure over an increment of length of the structure. Means are further provided to effect relative movement between the heating means and the clamping means to progressively heat and braze the skin layers to the core structure. To provide passage for the heating means, the spaced clamping means are individually retractable as the heating means and clamping means move relative to each other.

The acompanying drawings illustrate the best mode presently contemplated for carrying out the invention.

In the drawings:

FIG. 2 is an elevational view with parts broken away and shows one set of opposed clamping members in the retracted position to permit passage of the heating units;

FIG. 3 is a top plan view showing the heating units with their drive means removed with a portion of the tracks therefor disposed in tapered relation to describe an airfoil contour;

FIG. 4 is a sectional view taken through one of the burner units with parts broken away and sectioned;

FIG. 5 is an enlarged elevation of a portion of a burner unit with parts broken away and sectioned;

Figure 1:
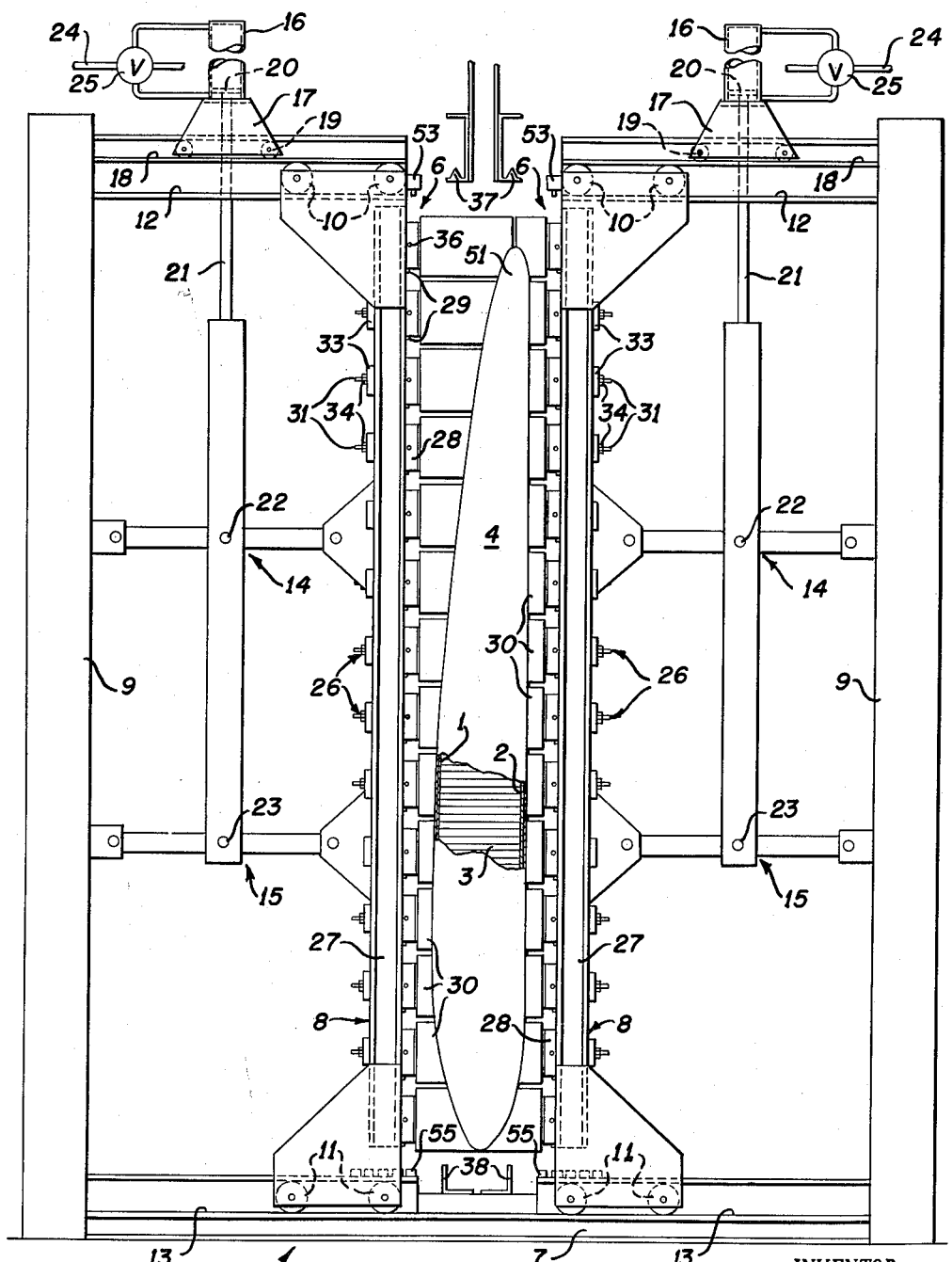
FIGURE 1 is an end elevational view partially in section showing one set of opposed clamping members for supporting the honeycomb assembly for brazing.
Figure 6:
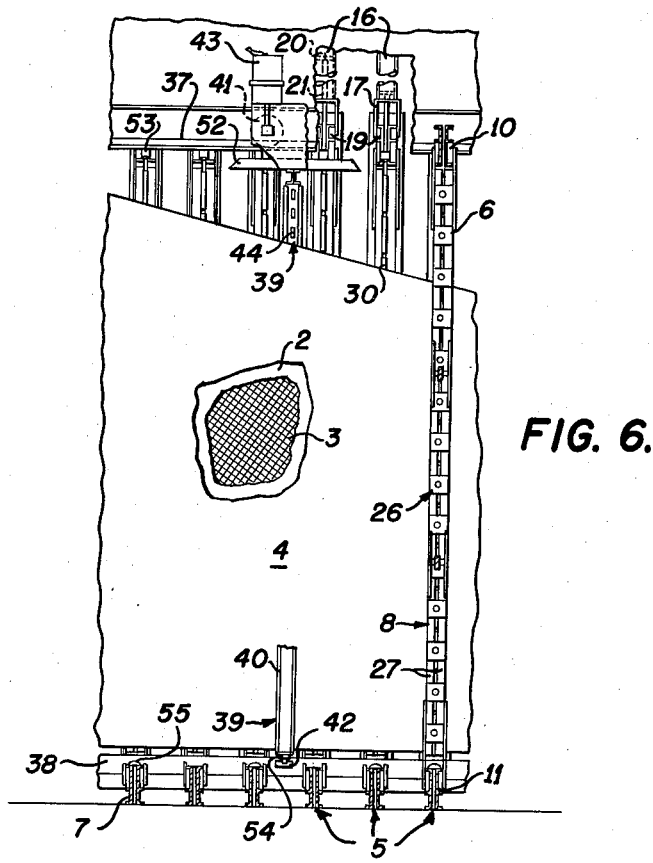
FIG. 6 is a portional side elevation with parts removed to show the spaced relation of the clamping assemblies and further show the burner units as the same move relative to the clamping assemblies.
Figure 8:
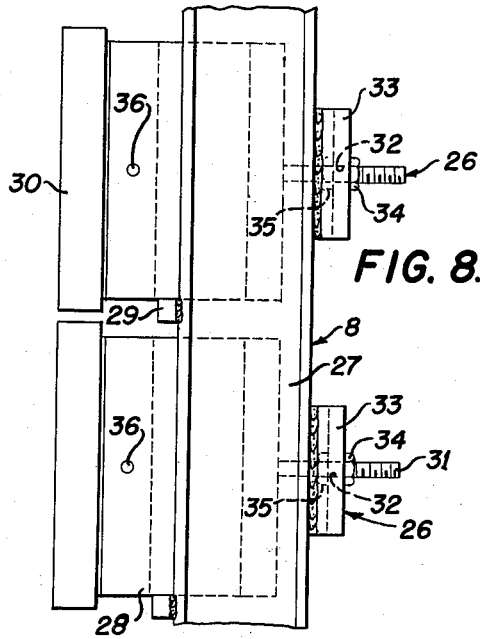
FIG. 8 is an enlarged elevational view of a portion of a clamping member showing further details of the shoe assemblies.

Referring to the drawings, the apparatus of this invention is shown as employed in brazing the outer skin layers 1 and 2, generally of stainless steel, to opposed sides of the honeycomb core 3 to form the structural member which in this instance is shown to be an aircraft wing structure. The wing structure is provided with the desired airfoil contour which tapers in the direction of the tip end and has a wing chord width that also tapers in the direction of tip end. The core 3 is shaped to define the wing structure contour and the skin layers 1 and 2 are assembled to the structure and meet along the leading edge, tip edge, and trailing edge. A suitable brazing compound is placed between the core 3 and the layers 1 and 2 during assembly and the assembled structure may be placed in a sealed envelope 4 in preparation for the brazing operation. The method as outlined in the copending application of Scott Henry, Serial No. 722,937, filed March 21, 1958, and assigned to the same assignee of this invention, may then be employed to braze layers 1 and 2 to the core 3.

The apparatus for performing the brazing operation comprises a plurality of longitudinally spaced clamping assemblies 5 which extend over the full length of the assembled structural member. The clamping assemblies 5 are adapted to clamp and support the assembly in position for brazing and to effect good contact between the skin layers 1 and 2 and the honeycomb core 3 of the brazing assembly. Each clamping assembly 5 includes a pair of opposed movable clamping portions 6 supported by the frame 7 and movable relative to the frame and to each other to clamp the assembled structure.

The clamping portions 6 each comprise a movable member 8 spaced inwardly from a corresponding fixed frame post 9 and is supported between upper rollers 10 and lower rollers 11 which are adapted to roll on transversely extending tracks 12 and 13, respectively, of the frame 7. The vertical members 8 are each connected to their corresponding frame post 9 by means of vertically spaced toggle linkages 14 and 15 which are adapted to open and close to move member 8 relative to the frame post.

The toggle linkages 14 and 15 of each clamping portion 6 are operated by an air or hydraulic cylinder 16 which is mounted on a base 17 and is adapted to move relative to track 18 on the rollers 19. A double acting piston 20 disposed in each cylinder 16 has a downwardly extending rod 21 pivotally secured to the respective knees 22 and 23 of the toggle linkages 14 and 15. Pressure fluid, from a source not shown, is alternately directed through conduit 24 against opposite sides of piston 20 as controlled by the two-way solenoid valve 25 to maintain the toggle linkages in the closed or clamping position shown in FIG. 1 or the open position shown in FIG. 2 and the cylinders 16 move along track 18 in accordance with toggle operation.

Figure 7:
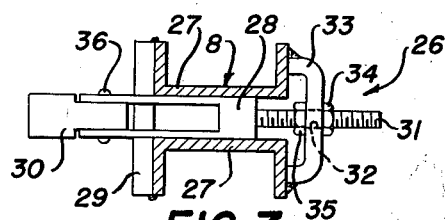
FIG. 7 is a sectional view through a clamping member showing details of the shoe assemblies.

Each movable member 8 carries a plurality of vertically spaced and aligned adjustable shoe assemblies 26 which are adapted to engage and hold the wing assembly in the brazing position. As most clearly shown in FIG. 7, the members 8 comprise spaced structural members 27 which support the individual shoe assemblies 26.

Shoe assemblies 26 each comprise a retainer 28 which is slidably disposed between structural members 27 and supported inwardly on the crossbars 29 carried by members 27. Retainer 28 is bifurcated inwardly to receive a shoe 30 therebetween and carries an elongated stud 31 oppositely from the shoe. The stud 31 extends through a hole 32 provided in bracket 33 which is mounted rigidly between members 27. Adjusting nuts 34 and 35 are threaded on stud 31 on opposed sides of bracket 33 and serve as means for adjusting the retainer 28 and shoe 30 relative to member 8 and to the brazing assembly.

The shoes 30 are pivotally mounted within their bifurcated retainer 28 at 36. The retainer 28 is adapted to permit a limited pivotal movement of the shoe relative to the retainer so that the shoe may adjust itself relative to the surface of the brazing assembly and thereby better distribute the clamping pressure over the face of the shoe. As shown clearly in FIG. 1, the face of each shoe 30 is vertically elongated and shaped to the contour of the brazing assembly to assure good distribution of the holding pressure.

A pair of transversely spaced upper tracks 37 extend over the full length of the clamping fixture substantially midway between the spaced movable members 8 and above the members. A second pair of tracks 38 parallel tracks 37 and are mounted on the lower portion of frame 7. The upper and lower tracks may be adjustable by means, not shown, along a transverse plane so that the tracks may generally follow the tapered outline of a wing structure assembly as shown in FIG. 3.

Each track 37 and its corresponding lower track 38 are adapted to carry a heating unit 39 therebetween on either side of the assembly to be brazed. Each heating unit 39 comprises a vertically extending frame 40 supported by a pair of longitudinally spaced, grooved wheels 41 which roll on upper track 37. A pair of transversely spaced wheels 42 are adapted to roll on opposed sides of the corresponding lower track 38 to guide the lower portion of the heating unit 39. A variable speed motor 43 is mounted on the upper end of frame 40 and is drivingly connected to one of the wheels 41 and thus serves as means for propelling the heating unit 39 relative to the brazing assembly at desired speeds.

As shown most clearly in FIGURES 2, 4 and 5, each heating unit 39 comprises a plurality of vertically spaced and aligned gas nozzles 44 which project inwardly from frame 40 of each heating unit. Gas under pressure, from a source, not shown, is supplied to the vertically extending manifold 45 provided within the rectangular frame housing 46 of heating unit 39. From the manifold 45, gas is delivered to the nozzles 44 by means of conduits 47 which extend through the inwardly facing wall of the frame housing 46. The aligned nozzles 44 may be enclosed by flexible shielding 48 extending between the frame 40 and the brazing assembly. Gas issuing forth from nozzles 44 is confined by vertically elongated openings 49 to provide a narrow vertically extended flame as shown in FIGS. 4 and 5. The spacing of the nozzles 44 is such that the flames overlap slightly to subject the brazing assembly to a vertically extending heating band of substantially uniform temperature.

Many aircraft sections, such as the wing assembly shown in the drawings, are tapered between their respective ends so that as the brazing operation progresses from the wide end of the tapered assembly toward the narrow end, certain of the burner nozzles 44 must be shut off before heating unit 39 has completed its travel along the assembly. This may be accomplished by means of solenoid valves 50 disposed in conduits 47 of the nozzles to be shut off which are controlled in a manner to be described hereinafter.

In operation the skin layers 1 and 2 are assembled to the honeycomb core 3 together with the brazing compound to form the brazing assembly 51 which is sealed around the edges of the assembly and then secured in position for brazing in the spaced clamping assemblies 5. If desired, the brazing assembly 51 may be enclosed in the sealed envelope 4 before securement within the clamping assemblies. To assist in holding the parts forming the assembly 51 together, a partial vacuum may be drawn within the assembly.

After the assembly 51 has been properly secured within the holding fixture, the heating units 39 are advanced relative to the assembly to progressively braze the skin layers 1 and 2 to the honeycomb core 3. As the heating units advance the movable members 8 of the successive clamping assemblies 51 are retracted relative to frame posts 9 to provide passage for the units. To properly time the retraction of each member 8, the heating units each carry a longitudinally extending cam 52 which is adapted to actuate a normally-closed switch 53 corresponding to each member 8 and carried by the frame of the respective assemblies 5. The respective switches 53 are connected in series with the corresponding solenoids operating the two-way valves 25 controlling the pressure fluid to the cylinder 16. As the cam 52 engages to open the respective switches 53, the corresponding solenoids are de-energized and valve 25 is set to direct the fluid pressure against the underside of piston 20 in cylinder 16 to effect retraction of member 8. As the heating unit 39 passes the retracted member 8, the elongated cam 52 maintains the corresponding switch 53 open. After the heating unit has passed the retracted member 8 and is clear of the member, the corresponding switch 53 recloses upon passage of cam 52 to energize the solenoid and reset valve 25 to direct the fludi pressure against the upper side of piston 20 and thus return the member 8 to the clamping position.

When the brazing asembly 51 is a tapered wing section, as shown in the drawings, certain of the burner nozzles 44 will no longer be required as the heating units 39 move in the direction of the narrower wing chord width and it is desirable to shut off such nozzles. This can be accomplished by mounting a plurality of transversely spaced normally closed switches 54 on the lower portion of the frame 40 of the heating unit. The respective switches 54 are connected in series with the corresponding solenoid for actuating valves 50 between an on and off position. Each of the switches 54 is actuated by a corresponding cam member 55 longitudinally aligned therewith and carried by the frames 7 of successive clamping assemblies 5. Thus, as the heating unit 39 advances relative to the tapered assembly 51 the ineffective nozzles 44 are progressively shut off as the respective switches 54 progressively engage their corresponding cam 55.

While the opposed heating units 39 are preferably individually driven as by the variable speed motors 43 in order to better control the heat on either side of the assembly 57, it may well be that for an assembly of generally uniform thickness throughout its length, the opposed units 39 could be connected and driven as a single unit.

In the preferred form of the invention the brazing assembly 51 is enclosed in the hermetically sealed envelope 4. So enclosed, the outer surface of skin layers 1 and 2 will be substantially unaffected throughout the brazing operation. If, however, the brazing assembly 51 is not enclosed within an envelope 4, the skin layers 1 and 2 may become oxidized to an extent requiring additional costly finishing operations. It is suggested therefore, when an envelope 4 is not employed, that a non-oxidizing gas, from a source not shown, be introduced in the nozzle area of the heating unit between the flexible shielding strips 48 in order to control the atmosphere adjacent the surface of skin layers 1 and 2.

While the heating units 39 shown and described utilize gas, it is conceivable that other forms of heating may be employed, such as induction heating for example.

The invention thus provides a method and apparatus for brazing the skin layer to a honeycomb core structure and is adapted for large structures particularly useful for aircraft.

Various modes of carrying out the invention are contemplated as being within the scope of the following claims particularly pointing out and distinctly claiming the subject matter which is regarded as the invention.

I claim:

1. In an apparatus for brazing an assembly, heating means adapted to heat the assembly, a plurality of spaced clamping means adapted to clamp and support the assembly in position for brazing, said clamping means and heating means being disposed in the path of each other when the clamping means are in the clamped position, means to effect relative movement between said heating means and the assembly to progressively braze the assembly, and means to individually and successively move each of said clamping means to a retracted position in timed relation to relative movement between the heating means and the assembly to thereby provide passage for the heating means.

2. In an apparatus for brazing an assembly, heating means adapted to heat the assembly, a plurality of spaced clamping means adapted to clamp and support the assembly in position for brazing and being disposed in the path of the heating means when the clamping means are in the clamp position, means to move the heating means relative to the assembly to progressively braze the assembly, and means to individually and successively move each of said clamping means to a retracted position in timed relation to advancement of the heating means to provide passage for the heating means and thereafter to reclamp the assembly.

3. In an apparatus for brazing an assembly, heating means adapted to heat the assembly, a plurality of longitudinally spaced and aligned clamping means, each of said clamping means comprising a pair of opposed clamping members adapted to clamp and support the assembly in position for brazing and being disposed in the path of the heating means when the clamping members are in the clamped position, longitudinally extending track means for said heating means, means to move the heating means along the track means relative to the assembly to progressively braze the assembly, and means to individually and successively move each of said clamping members to a retracted position in timed relation to advancement of the heating means to provide passage for the heating means and thereafter to reclamp the assembly.

4. The invention of claim 3 wherein the heating means comprises a pair of opposed members adapted to receive the assembly therebetween for brazing the corresponding sides of the assembly.

5. The invention of claim 3 wherein the heating means comprises a pair of opposed members adapted to receive the assembly therebetween, said members having a plurality of vertically spaced and aligned gas burners, some of which may become ineffective as the heating member moves relative to the assembly because of the shape of the assembly, and means responsive to advancement of the heating member for shutting off the ineffective burners.

6. The invention of claim 3 wherein the heating means comprises a pair of opposed members adapted to receive the assembly therebetween and wherein the track means comprise a separate track for each heating member, a drive wheel on each heating member and adapted to roll on the corresponding track, and separate drive means drivingly connected to the respective drive wheels to advance the heating members independently of each other.

7. The invention of claim 3 wherein the opposed clamping members carry a plurality of vertically spaced and aligned shoe members, the inner surfaces of said shoe members being generally contoured to complement the surface of the assembly engaged thereby to place the assembly portions in intimate contact with each other during clamping.

8. The invention of claim 3 wherein the opposed clamping members carry a plurality of vertically spaced and aligned shoe members, said shoe members being pivotally mounted within a retainer carried by the corresponding clamping member and adapted to articulate relative to the assembly to properly seat against and distribute the clamping pressures.

References Cited in the file of this patent

UNITED STATES PATENTS

| | | |
|---|---|---|
| 2,176,664 | Burke | Oct. 17, 1939 |
| 2,256,879 | Cornell | Sept. 23, 1941 |
| 2,332,625 | Ellis et al. | Oct. 26, 1943 |
| 2,389,526 | Maulding | Nov. 20, 1945 |
| 2,430,188 | Sargent | Nov. 4, 1947 |
| 2,446,148 | Weightman | July 27, 1948 |